Patented Sept. 13, 1938

2,129,733

UNITED STATES PATENT OFFICE 2,129,733

PRODUCTION OF LIQUID HYDROCARBONS FROM GASEOUS OLEFINES

Stewart C. Fulton and Thomas Cross, Jr., Elizabeth, N. J., assignors to Standard Oil Development Company, a corporation of Delaware No Drawing. Application October 7, 1936, Serial No. 104,440

11 Claims. (Cl. 196—10)

The present invention relates to the polymerization of normally gaseous olefines into materials of high molecular weight, particularly to hydrocarbons boiling within the gasoline range. More specifically, the present invention is directed to the catalysis of such polymerizations.

According to the present invention, normally gaseous olefins, such as ethylene, propylene and the butylenes, are polymerized at temperatures ranging between about 200° C. and 400° C. under atmospheric or superatmospheric pressure by the action of catalysts prepared by depositing compounds of the heavier metals of Group III of the Periodic System, such as indium, lanthanum and thallium, on suitable supports, such as silica gel, bauxite, pumice, kaolin, active carbon, activated alumina and the like.

The catalysts employed according to the present invention are, in general, prepared by soaking the selected carrier in a solution of a compound of one of said heavy metals of Group III of the Periodic System and then drying the impregnated carrier. When a gel, such as silica gel, is employed as the carrier, it is necessary that the drying operation be conducted carefully so as to avoid the splitting off from the gel of chemically bound water of hydration. Usually the drying operation is conducted at about 200° C. in the case of a gel support, or higher, if desired, in the case of other porous supports of the character mentioned above. The amount of the compound of the heavier metal of Group III contained in the finished catalyst varies with the degree of impregnation of the carrier and with the concentration of the solution used for impregnating the carrier. Amounts as low as 0.5% by weight have been found to be effective. Preferably, the heavy metal compounds should constitute between about 5 and 10% by weight of the total catalyst.

As specific examples of mixed catalysts contemplated for use according to the present invention are lanthanum oxide on silica gel, indium oxide on silica gel, thallium oxide on silica gel, lanthanum oxide on bauxite, thallium oxide on active carbon, lanthanum oxide on activated alumina, indium oxide on thoria, and lanthanum oxide on beryllia. Other metal oxides can be added in small amounts to the catalyst. Among these are zinc oxide, cadmium oxide, alumina, zirconia, titania, thoria and beryllia. As indicated above, some of these oxides may be used as supports, but they also impart a beneficial effect when used in small amounts in conjunction with said heavy metal compounds of Group III on other supports, particularly on silica gel. Of the catalysts mentioned, the preferred species are the compounds of lanthanum and thallia with or without other oxides on silica gel.

Among the hydrocarbons which may be treated according to the present invention are pure olefines, such as propylene and butylene derived by dehydration of the corresponding alcohols, natural occurring gases containing $C_2$, $C_3$ and $C_4$ olefines, the concentration of which may be increased by catalytic dehydrogenation or cracking, and refinery gases containing $C_2$, $C_3$ and $C_4$ olefines. Where the initial material is a mixed gas, such as refinery or natural gas, it is desirable to subject the gas to fractionation so as to concentrate $C_3$ and $C_4$ hydrocarbons and increase conversion per pass. Satisfactory conversions are obtainable at atmospheric pressure. Higher conversions are obtainable at elevated pressures, such as pressures in excess of 100 lbs./sq. in. and preferably of the order of 200–500 lbs./sq. in. Increased pressure makes it possible to operate at lower temperatures within the range indicated.

These catalysts suffer a loss of activity with extended use, but may be reactivated in situ by including in the feed a very small percentage of a hydrogen or alkyl halide, such as methyl, ethyl, isopropyl, butyl or similar chloride. The percentage of the activating agent added may, in general, vary from 0.2% to 2 or 3% of the feed. In some cases activity of the catalyst may be sustained by adding a small per cent of steam to the feed. The purpose of the steam is to make up for any loss of chemically bound water in the silica gel, it having been found that a loss of water of hydration in the silica gel reduces the activity of the catalysts.

The apparatus employed for carrying out the process of the present invention is simple in construction, consisting merely of a reaction tube preferably composed of a material such as quartz, silica or "Nichrome" steel, which does not catalyze the decomposition of hydrocarbons to carbon and hydrogen, and packed with the catalyst which is in granular or molded pill form. The reaction tube may be heated in a conventional manner, such as by electrical resistance. For insurance of constant temperature, the tube may be imbedded in a heated metal block or in a molten metal or other liquid heating medium. The amount of heat which must be supplied to the reaction chamber is usually not very great since the reaction is exothermic. When the olefine concentration of the feed stock is very high, it may be necessary at times to withdraw heat from the reaction chamber so as to maintain the desired temperature. When the feed stock is obtained by dehydration of alcohols over a dehydration catalyst, such as bauxite, at about 400° C., the polymerization tube may be connected in series with the dehydration chamber so that the heat contained in the gases leaving the dehydration chamber can be utilized.

The general character of the effectiveness of these catalysts for the polymerization of olefines is illustrated by the activity of lanthanum oxide on silica. This catalyst was prepared by diluting 60 cc. of sodium silicate (40° Bé.) with an equal volume of water and precipitating the silica gel therefrom by the addition of 5N.HCl. The gel was washed free of chlorides and was then mixed with a 0.2N solution of 5 grams of lanthanum nitrate. The mixture was digested for some time on a steam bath, after which the gel was removed, and carefully dried at 220° C.

A refinery butane cut containing about 37.5% of butylenes was conducted into a reactor containing 19 grams of the above catalyst heated to 250° C. at a feed rate of 21 liters per hour. There was produced approximately 5 grams of gasoline polymer per hour (about 25% conversion based on the olefine content).

The catalytic activity, that is, the grams of polymer produced per gram of catalyst per hour, was .27 for the first hour, but in the course of the second hour dropped to .16. A small amount of HCl was then fed into the reaction chamber with the feed gas, whereupon in the course of the next hour the catalytic activity rose to .35. In a 6-hour run the average catalytic activity was about .25.

Whether or not a catalyst is effective in this reaction can be demonstrated qualitatively by simply arranging the catalyst in the reaction chamber and causing the effluent gases to pass thru a receiver cooled sufficiently to condense gasoline polymers. Accordingly, it was not necessary to conduct quantitative experiments with all of the specific catalysts mentioned. It may be stated, however, that present indications are that lanthanum oxide on silica gel is the most effective of the specific catalysts enumerated.

In practical operation, recycling of unconverted feed stock after separation of the polymers formed is necessary. This process may be advantageously combined with a catalytic dehydrogenation of gaseous paraffins, as well as with dehydration of the corresponding alcohols. When dehydrogenation of gaseous paraffins is the first step, the unconverted feed in the polymerization chamber may be recycled directly to the dehydrogenation unit as its content of paraffins is substantially consumed, or it may be sent directly to a thermal polymerization unit operated under conditions suitable for the conversion of gaseous paraffins to liquid products, that is, at a temperature in excess of about 900° F. and under a pressure of at least 500 lbs./sq. in., usually about 1,000 to 2,000 lbs./sq. in.

In the appended claims the expression "heavy metal of Group III" is used to designate a metal having a specific gravity of at least 4. In these claims it is intended to claim the present invention as broadly as the prior art permits.

We claim:

1. A process for the conversion of normally gaseous olefines into higher boiling polymers which comprises contacting said olefines at a polymerizing temperature with a catalyst composed of a compound of a heavy metal of Group III of the Periodic System associated with silica gel.

2. A process according to the preceding claim operated under superatmospheric pressure.

3. A process according to claim 1 in which the temperature is between 200 and 400° C.

4. A process for the conversion of normally gaseous olefines into higher boiling polymers which comprises contacting said olefines with a catalyst composed of 0.5% to 10% of a compound of a heavy metal of Group III of the Periodic System associated with 90% to 99.5% of silica gel under polymerizing conditions adapted to maintain the gel structure.

5. A process for the conversion of normally gaseous olefines into higher boiling polymers which comprises contacting said olefines at a temperature between about 200° and 400° C. with a catalyst composed of 0.5% to 10% of a compound of a heavy metal of Group III of the Periodic System and 90% to 99.5% of silica gel.

6. A process according to claim 4 in which the compound of a heavy metal of Group III is lanthanum oxide.

7. A process according to claim 4 conducted under superatmospheric pressure.

8. A process according to claim 4 in which during the course of the reaction the activity of the catalyst is maintained by adding to the olefinic feed stock a small percentage of a substance selected from the group consisting of hydrogen halides and alkyl halides.

9. A process according to claim 5 in which the feed stock in an olefine having 4 carbon atoms.

10. A process according to claim 5 in which the compound of the heavy metal is indium oxide.

11. A process according to claim 5 in which the compound of the heavy metal is thallium oxide.

STEWART C. FULTON.
THOMAS CROSS, JR.